(12) United States Patent
Cottrell

(10) Patent No.: US 6,572,312 B2
(45) Date of Patent: Jun. 3, 2003

(54) POWER SCREW LOAD RETENTION APPARATUS AND SYSTEM

(75) Inventor: D. Michael Cottrell, Gainesville, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

(21) Appl. No.: 09/910,668

(22) Filed: Jul. 20, 2001

(65) Prior Publication Data

US 2003/0017019 A1 Jan. 23, 2003

(51) Int. Cl.[7] .............................. B60P 3/079; B60P 3/08
(52) U.S. Cl. ........................................... 410/11; 410/23
(58) Field of Search .............................. 410/7, 8, 9, 10, 410/11, 12, 103, 19, 22, 23, 24, 26

(56) References Cited

U.S. PATENT DOCUMENTS

| | | | | |
|---|---|---|---|---|
| 1,934,697 A | * | 11/1933 | Butterworth | 410/10 |
| 2,205,273 A | * | 6/1940 | Radey | 410/10 |
| 2,969,023 A | * | 1/1961 | Chapman et al. | 410/12 |
| 3,038,740 A | | 6/1962 | Blunden | 410/12 |
| 3,158,108 A | * | 11/1964 | Sharp | 410/103 |
| 3,465,691 A | * | 9/1969 | Simmons | 410/12 |
| 3,685,856 A | | 8/1972 | Blunden | 410/12 |
| 3,841,235 A | | 10/1974 | Wheeler et al. | 410/12 |
| 4,068,813 A | | 1/1978 | Chatwin et al. | 410/7 |
| 4,081,196 A | | 3/1978 | Dandridge, Jr. | 410/28 |
| 4,130,067 A | | 12/1978 | Kilgus | 410/12 |
| 4,131,264 A | | 12/1978 | Patterson, III et al. | 24/68 CT |
| 4,223,869 A | | 9/1980 | Patterson, III et al. | 24/68 CD |
| 4,567,627 A | | 2/1986 | Patterson, III et al. | 24/68 CT |
| 4,875,814 A | * | 10/1989 | Weller | 410/66 |
| 5,067,862 A | * | 11/1991 | Andre | 410/26 |
| 5,180,262 A | | 1/1993 | Westerdale | 410/12 |
| 5,746,554 A | | 5/1998 | Boydstun, IV et al. | 410/12 |
| 5,755,540 A | | 5/1998 | Bushnell | 410/29.1 |
| 5,836,730 A | * | 11/1998 | Boydstun, IV et al. | 410/12 |
| 6,171,036 B1 | | 1/2001 | Boydstun, IV et al. | 410/12 |

* cited by examiner

Primary Examiner—D. Glenn Dayoan
Assistant Examiner—Paul Chenevert
(74) Attorney, Agent, or Firm—Hinkle & O'Bradovich, LLC

(57) ABSTRACT

A power screw load retention system is described. The system typically includes four power screw sections each having a threaded shaft connected to a power source located within an elongated channel. A carriage is in threaded engagement with the threaded shaft and is adapted to translate within the channel. The carriage is connected to a connecting member such as a chain that connects to the under structure of a vehicle. Typically, the four power screw sections are located on a platform that holds the vehicle. Several of these platforms are located on a vehicle transporter. All of the power sources may be connected to a control unit.

20 Claims, 8 Drawing Sheets

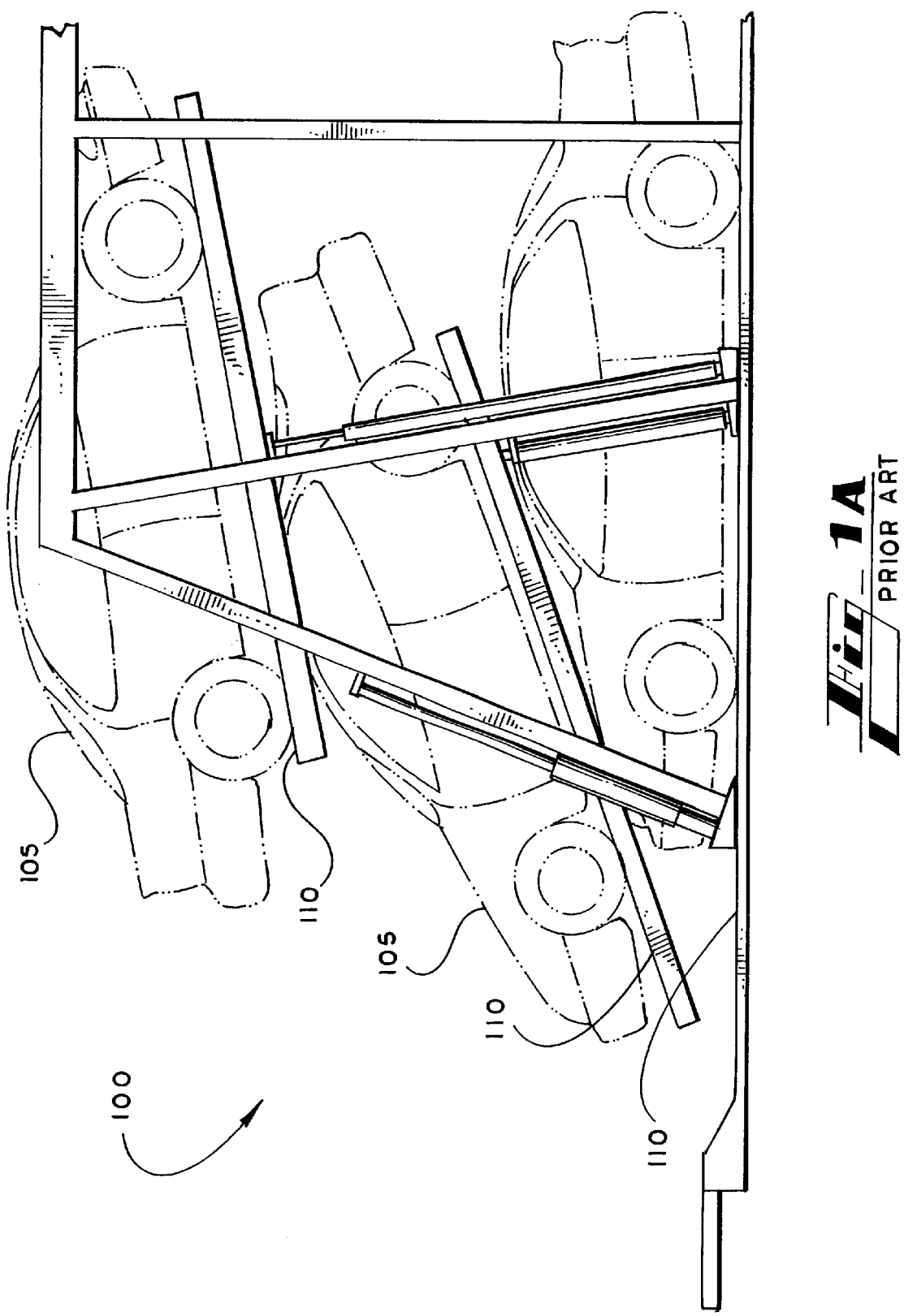

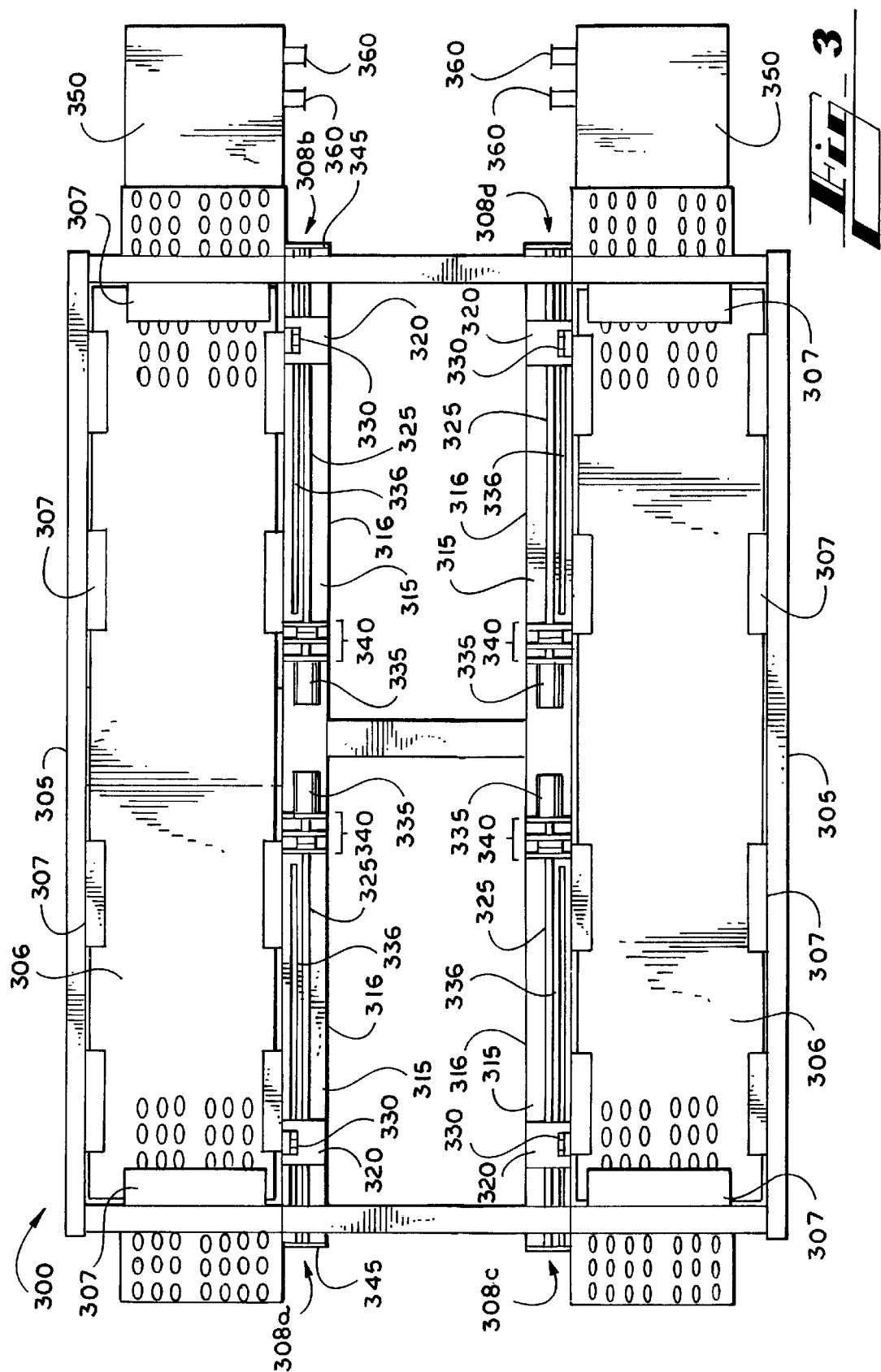

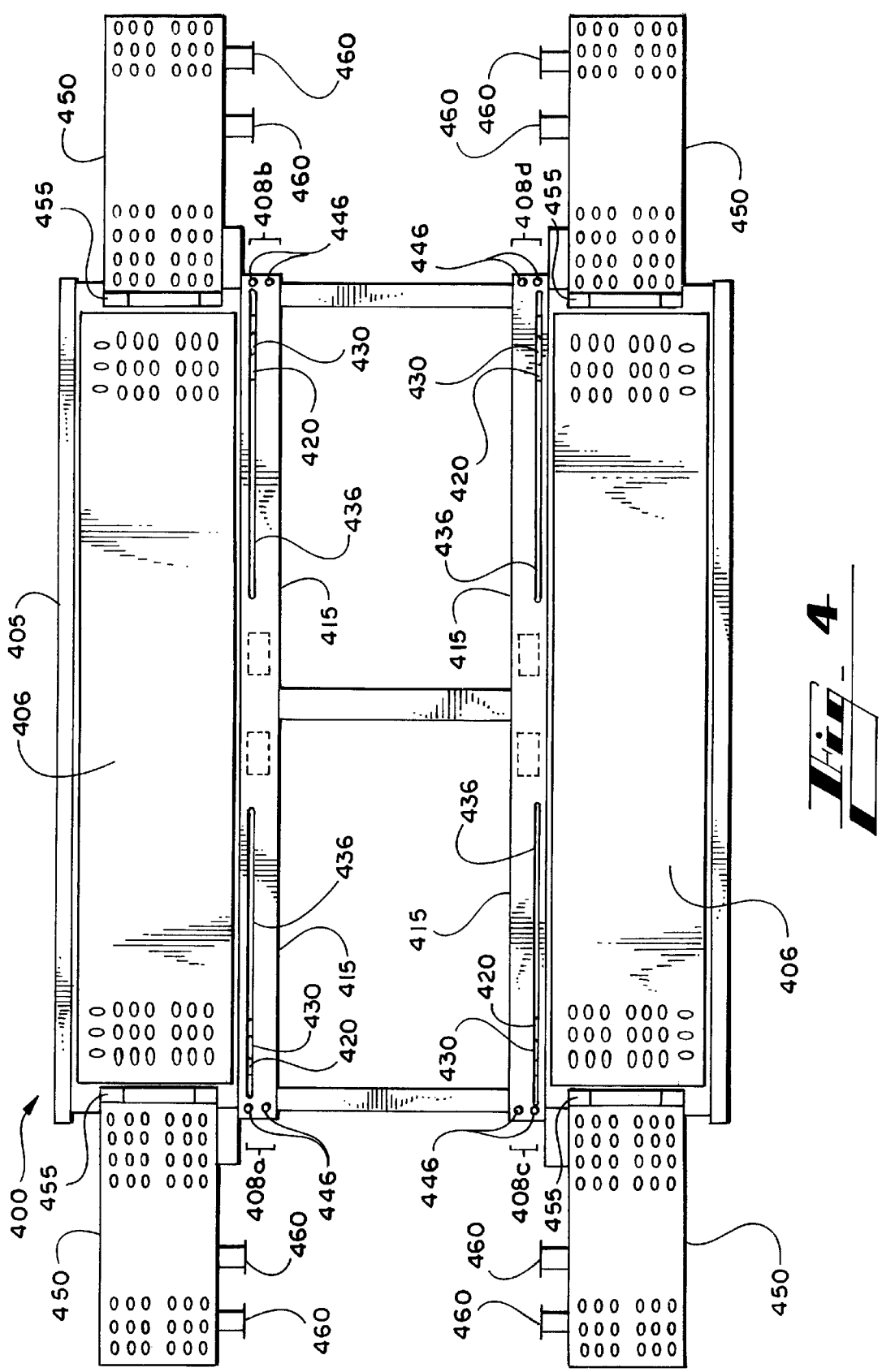

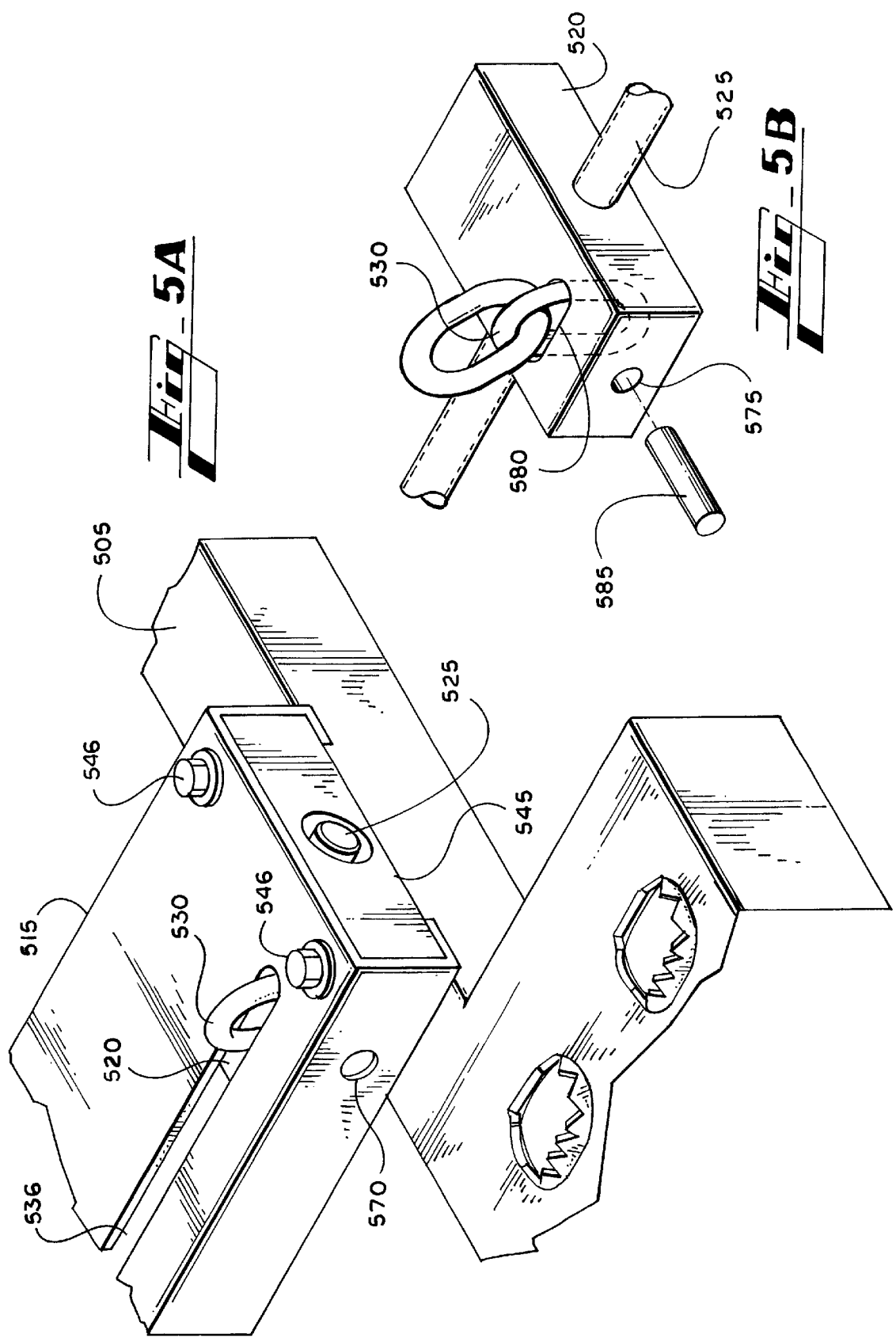

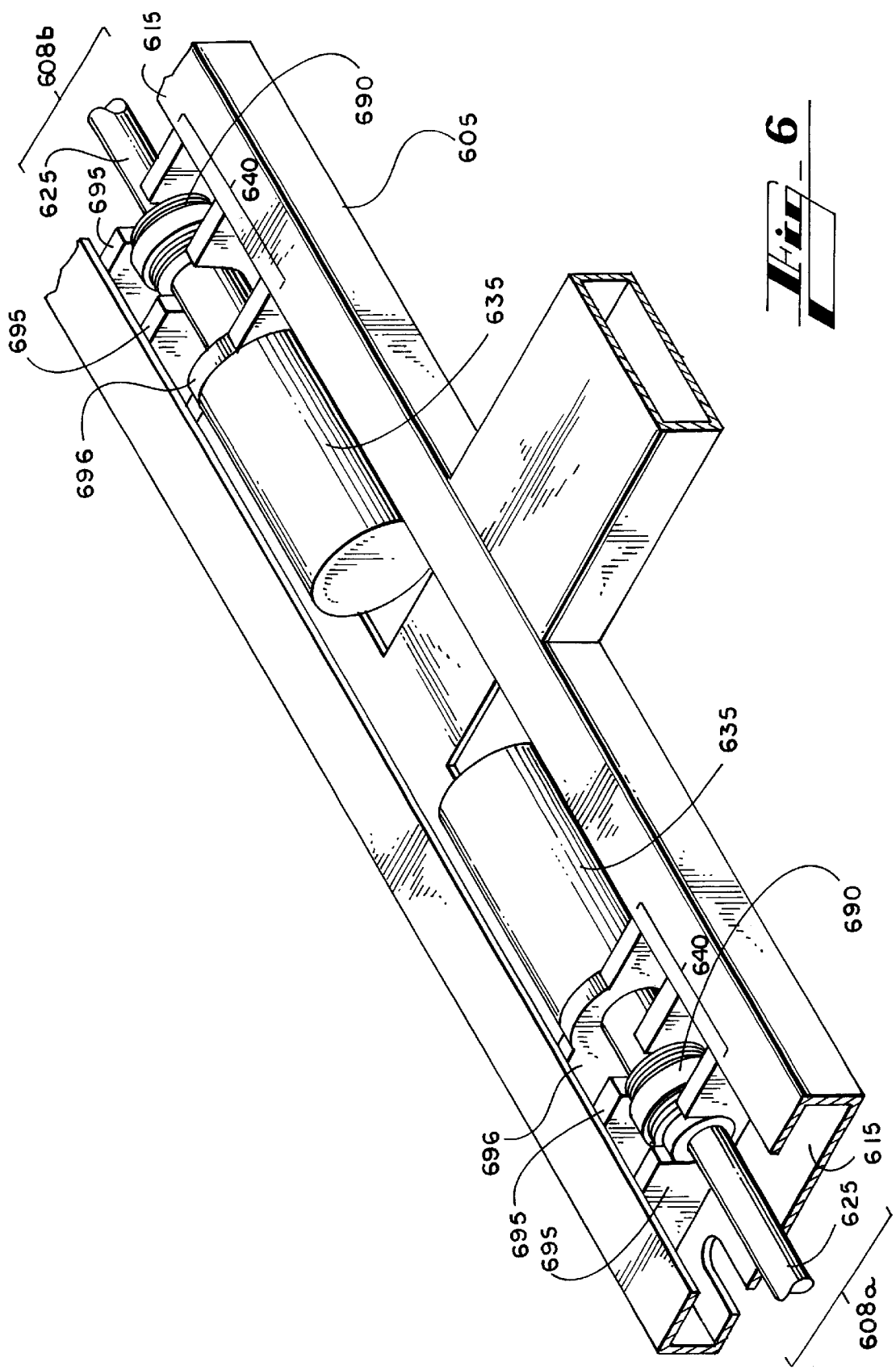

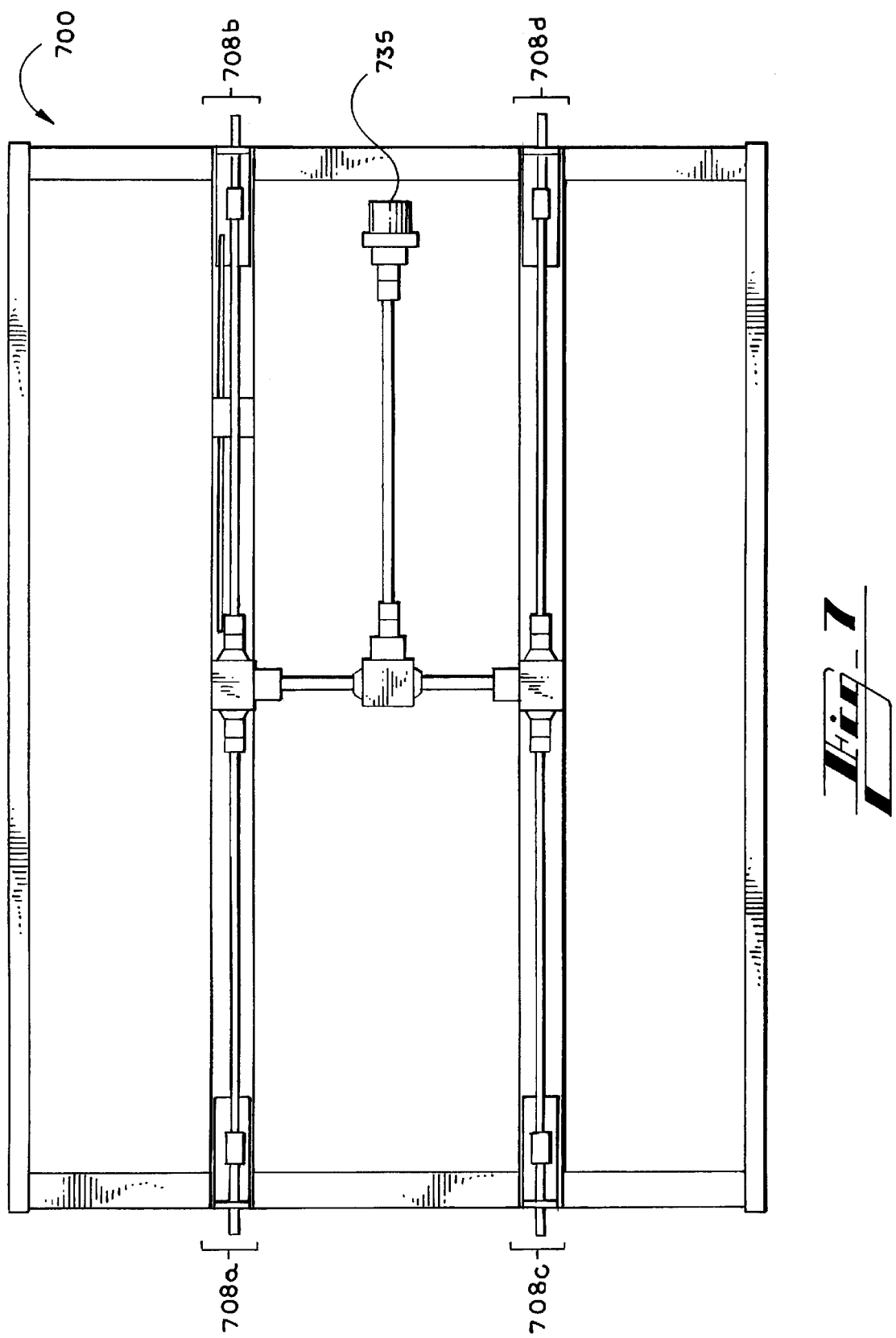

POWER SCREW LOAD RETENTION APPARATUS AND SYSTEM

BACKGROUND OF THE INVENTION

I. Field of the Invention

The present invention relates generally to the field of load retention more particularly to a power screw load retention system.

II. Description of the Related Art

FIG. 1A illustrates one type of a prior art vehicle transport trailer 100. Several vehicles 105 can be transported on the trailer. Each of the vechicles typically has its own platform 110 onto which each vehicle 105 is secured.

FIGS. 1B–1C illustrate prior art vehicle trailer tie down systems. As previously described, each vehicle 105 is secured to its platform 110. FIG. 1B illustrates the vehicle 105 tied to its platform 110 by chains 115 in a "V" arrangement. FIG. 1C illustrates the vehicle 105 tied to its platform by chains 115 in an "A" arrangement. The vehicle 105 is typically restrained to the platform 100, and therefore the trailer, by connecting the chains 115 to the frame of the vehicle 105 and the platform 110 or other part of the trailer. The chains 115 are placed in tension to prevent movement. The chains 115 are tightened in opposite directions to prevent the vehicle 105 from shifting front to back or vice versa. Currently, locking mechanisms 120 are used to keep the chain 115 from loosening due to forces acting upon the vehicle 105 (e.g. gravity, centripetal and other forces asserted on the vehicle 105 from the trailer or otherwise). There are many types of mechanisms 120 such as ratcheting and clamping devices that are typically manually tightened by the operator of the trailer. The chain 115 also may be routed around idlers 125 or the tightening mechanism 120 has to be relocated in order to achieve sufficient tension in the chain 110 in the correct direction to properly secure the vehicle 105.

The operator of the truck that hauls the trailer is typically responsible for tightening the vehicles into place. This process requires the operator to tighten chains 115 on each of the four corners of each car.

SUMMARY OF THE INVENTION

In general, the invention features a power screw load retention system that uses hydraulics to automatically and securely attach a vehicle to a transport trailer. The power screw load retention system can be used to tie down any load securely to a trailer or other structure. This system provides even tensions on all tie down locations of the vehicles being transported and thus prevents undue stresses on the vehicles.

In general, in one aspect, the invention features a power screw apparatus, including an elongated channel, a power source located on one end of the channel, a shaft connected to the power source and in threaded engagement with a carriage, the carriage adapted to translate along the channel and an end cap located on a side of the channel opposite the power source.

In an implementation, the apparatus further includes a link connected to the carriage, the link protruding from a longitudinal opening located on an upper surface of the channel and running a portion of the length of the channel.

In another implementation, the apparatus includes a rod located within the carriage and substantially perpendicular to the shaft, the rod adapted to hold the link within the carriage.

In another implementation, the link is adapted to connect to a connecting member such as a chain, strap or rope.

In another implementation, the end cap is coupled to the shaft.

In another implementation, the shaft includes an anti-backdriving thread profile.

In still another implementation, the apparatus includes a bearing support located at a fixed location within the channel between the carriage and the power source and a shaft coupling connected between the shaft and the power source and positioned within the bearing support, wherein the bearing support includes a first substantially rectangular holder located on one side on the shaft coupling, a second substantially rectangular holder located on the other side of the shaft coupling, wherein the first and second holders are substantially perpendicular to the shaft and positioned within the channel and a mounting flange located between the power source and the shaft coupling.

In yet another implementation, the power source is hydraulic.

In another aspect, the invention features a powerscrew load retention system, including a platform having a frame and one or more surfaces adapted to receive a load, wherein the platform includes a plurality of power screw sections having a load retention power screw apparatus, each apparatus including an elongated channel, a power source located on one end of the channel, a shaft connected to the power source and in threaded engagement with a carriage, the carriage adapted to translate along the channel and an end cap located on a side of the channel opposite the power source.

In an implementation, one surface of the frame is a first surface on a first side of the frame and another surface is a second surface on a second side of the frame, substantially parallel to and in the same plane as the first surface.

In another implementation, the system further includes a first line located adjacent the first surface that is parallel to a second line located adjacent the second surface, wherein a first and second power screw section are aligned with the first line and a third and fourth power screw section are aligned with the second line.

In still another implementation, the power source of the first power screw section is adjacent and coupled to the power source of the second power screw section, and wherein the power source of the third power screw section is adjacent and coupled to the power source of the fourth power screw section.

In yet another implementation, the carriage of the first section and the carriage of the second section are adapted to translate toward one another and away from one another, and the carriage of the third section and the carriage of the fourth section are adapted to translate toward one another and away from one another.

In still another implementation, the invention features a vehicle transporter including a plurality of platforms adapted to receive a vehicle, each of the platforms having a plurality of load retention screw apparatuses, each apparatus including an elongated channel, a power source located on one end of the channel, a shaft connected to the power source and in threaded engagement with a carriage having a link protruding from a longitudinal opening located along a top surface of the channel, the carriage adapted to translate along the channel and an end cap located on a side of the channel opposite the power source.

In an implementation, the transporter further includes a connecting member connected to the link of each carriage, each connecting member adapted to connect to the vehicle.

In another implementation, the transporter further includes flippers connected to the platform, the flippers adapted to load the vehicle onto the platform.

In another implementation, the flippers include idlers adapted to re-route the connecting members from the link to the vehicle.

In another implementation, the power sources are connected to a central control unit.

One advantage of the invention is that it reduces or eliminates the need for additional tightening/locking mechanisms to prevent the chains from loosening.

Another advantage is that it reduces the time it takes for the operator of the transporter to secure the vehicles to the transporter.

Another advantage is that it reduces the need for idlers. It also removes the need to relocate any tightening mechanisms to achieve sufficient tension in the chain in the correct direction to properly secure the load.

Another advantage is that the required length of the chains can be reduced and the system provides a more even distribution of the chain loads on all four positions reducing the risk of damage to the vehicle.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1A illustrates a prior art car trailer;

FIG. 3 illustrates a bottom view of an embodiment of a power screw load retention system;

FIG. 4 illustrates a top view of an embodiment of a power screw load retention system;

FIG. 5A illustrates a close up view of an embodiment of a carriage and an embodiment of an end cap;

FIG. 5B illustrates a close up of an embodiment of a carriage;

FIG. 6 illustrates a close up of an embodiment of two power sources and an embodiment of two bearing supports; and FIG. 7 illustrates a skeletal view of an alternative embodiment of a power screw load retention system.

DETAILED DESCRIPTION OF THE INVENTION

Power Screw Load Retention System

Figures 1B, 1C:
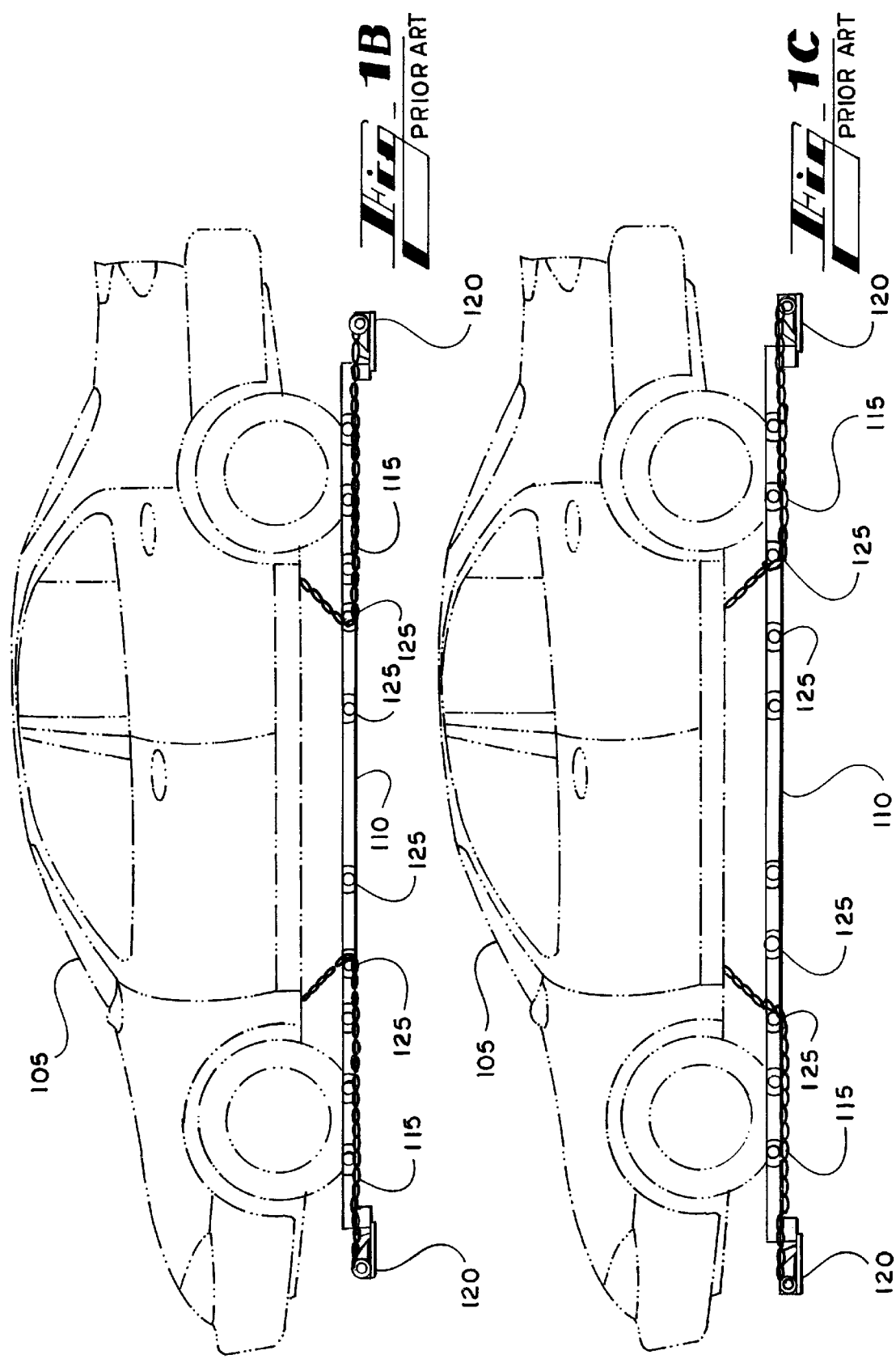
FIGS. 1B–1C illustrate prior art car trailer tie down systems.
Figure 2:
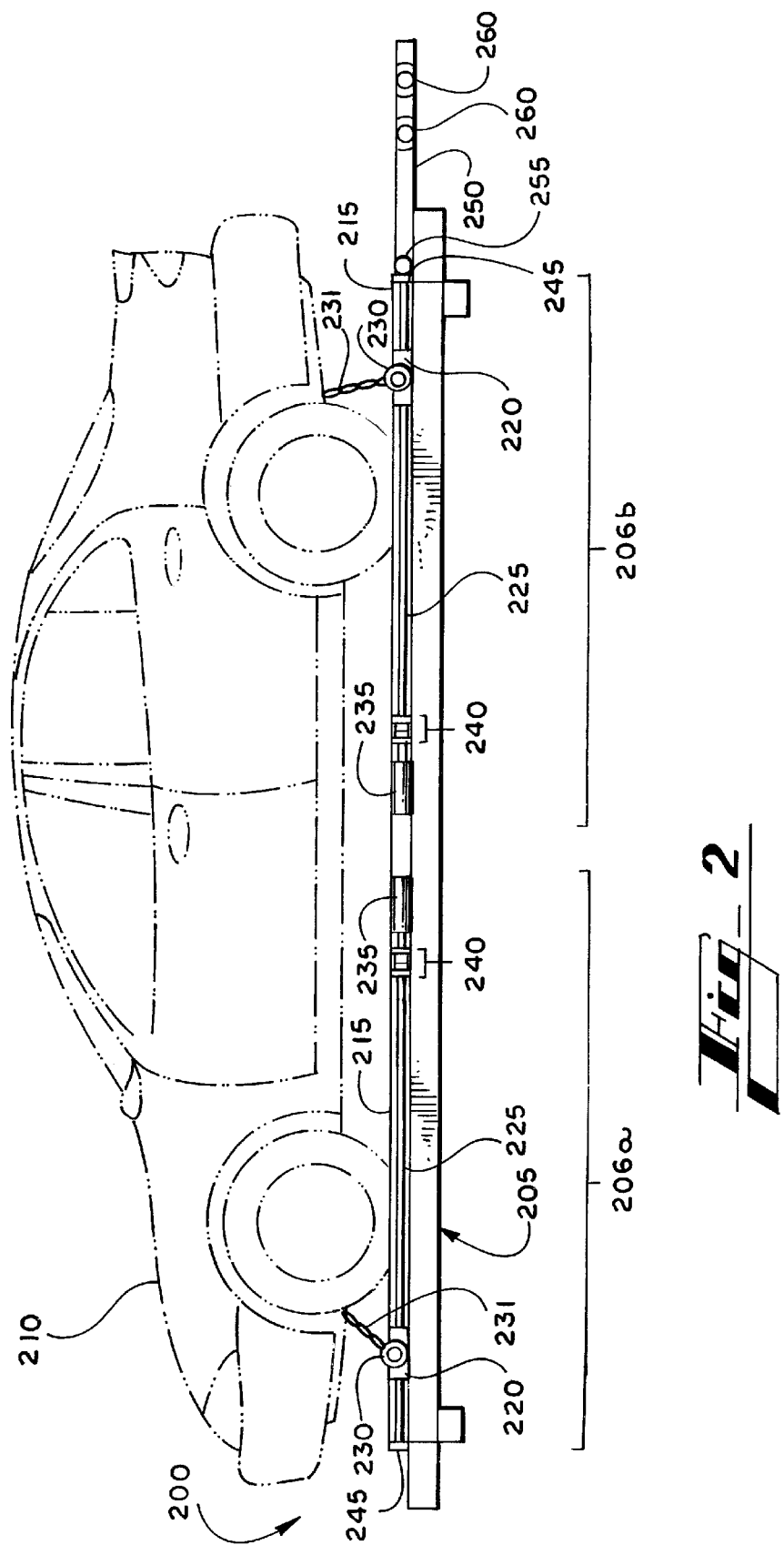
FIG. 2 illustrates a side view of an embodiment of a power screw load retention system.

FIG. 2 illustrates a side view of an embodiment of a power screw load retention system 200. A platform 205 is adapted to receive a load such as vehicle 210. Throughout the following description, particular reference is made to vehicle transports as the typical implementation for the power screw load retention system 200. Therefore, the platform 205 typically includes two ramps upon which a vehicle can drive. However, it is understood that the embodiments described can be used for any implementation that requires tying a load to any surface. Several platforms such as platform 205 are positioned on a car transport at various angles. FIG. 2 illustrates two distinct power screw sections 206a, 206b. The power screw sections are used to secure the vehicle to the platform 205. Each of the power screw sections 206a, 206b are similarly constructed. The following description describes either of the sections 206a, 206b.

A channel 215 is attached to the platform 205. A carriage 220 is adapted to translate within the channel 215 along a threaded shaft 225. The carriage includes inner threads that are in threaded engagement with the threaded shaft 225. In an embodiment, the shaft 225 has typically an anti-back driving type thread profile. The carriage 220 includes a link 230 that is adapted to connect the carriage 220 to a chain 231 or other connecting member (e.g. rope, strap and the like). The inner walls of the channel 215 can be used as a bearing support for the carriage 220. In addition, the threaded shaft 225 can be adapted to support the forces of the load as well. The carriage 220 is also a bearing support for the shaft 225.

The threaded shaft 225 is rotated by a power source 235. The power source 235 is typically a hydraulic source although other types of power sources can be used, such as but not limited to an electric motor, hand crank, gearbox and the like. A bearing support 240 is adapted to position the threaded shaft 225 within the channel 215. A coupling supports the power source 235 within the channel 215 and the bearing support 240 supports the coupling.

The channel 215 can include an end cap 245 located at the end of or within the channel 215, typically on the opposite end of the power source 235. The end cap 245 is secured at the end of the channel 215 and is adapted to prevent the carriage 220 from threading itself off the threaded shaft 225 and possibly translating out of the channel 215 as is threads along the threaded shaft 225. The end cap 245 can also be used as a further bearing support for the threaded shaft 225. In another embodiment, the positions of the power source 235 and the end cap 245 can be switched. A further detailed description of the operation of the system 200 is discussed below.

The platform 205 can further include one or more flippers 250 that can be used to position to load the vehicle 210 on the platform 205. The flippers 250 can rotate about a hinge 255. The flipper 250 can further include one or more idlers 260. The idlers 260 can be used to route the chain 231 in different directions if so needed. The use of the flipper 250 and idlers 260 may be used to extend the reach of the system beyond its length.

FIG. 3 illustrates a bottom view of an embodiment of a power screw load retention system 300. This view of the system 300 illustrates that the platform (205 in FIG. 2 above) typically includes a frame 305 that supports a substantially planar surface 306 by a series of brackets 307. It is understood that a platform can be constructed various other ways. FIG. 3 illustrates four distinct power screw sections 308a, 308b, 308c, 308d. In a typical embodiment, the power screw load retention system includes four of these sections 308a, 308b, 308c, 308d, each adapted to secure one of four corners of a load such as a vehicle. Each of the power screw sections 308a, 308b, 308c, 308d are similarly constructed. The following description describes any of the sections 308a, 308b, 308c, 308d.

Each of the power screw sections 308a, 308b, 308c, 308d can be similarly described as with respect to FIG. 2. A channel 315 is attached to the platform. A carnage 320 is adapted to translate within the channel 315 along a threaded shaft 325. The channel 315 typically wraps around a large portion the carriage 320, thereby securing the carriage 320 in the channel 315. A lip 316 further secures the carriage 320 in the channel 315. The carriage includes inner threads that are in threaded engagement with the threaded shaft 325. The carriage includes a link 330 that is adapted to connect the carriage 320 to a connecting member (not shown). The link 330 protrudes from the channel on the upper side of the platform through a longitudinal opening 336 that runs along the channel 315. The longitudinal opening 336 allows the link to translate along with the carriage 315 as the carriage 315 translates along the threaded shaft 325. The threaded shaft 325 can be rotated by a power source 335. A bearing support 340 is adapted to position the threaded shaft 325 within the channel 315. A coupling supports the power source 335 within the channel 315, and the bearing support 340 supports the coupling. The channel 315 can include an end cap 345 located at an open end of the channel, typically on the opposite end of the power source 335. As explained above, the end cap 345 is secured at the end of or within the channel 315 and is adapted to prevent the carriage 320 from threading itself off the threaded shaft 325 and therefore translating out of the channel 315 as is threads along the threaded shaft 325. The end cap 345 can also be used as a further bearing support for the threaded shaft 325. The platform can further include one or more flippers 350 that can be used to position the load on the platform. The flippers 350 can further include one or more idlers 360. The idlers 360 can be used to route the connecting member in different directions if so needed to achieve load retention in the correct direction beyond the length of the system.

FIG. 4 illustrates a top view of an embodiment of a power screw load retention system 400. As described above, a frame 405 supports a flat planar surface 406 that is adapted to support a load such as a vehicle. FIG. 4 illustrates an embodiment of a system 400 that is adapted to support a vehicle. Once again four distinct power screw sections 408a, 408b, 408c, 408d are shown and the following description applies to any of the sections 408a, 408b, 408c, 408d.

In this view, a longitudinal opening 436 is shown as part of a channel 415. A portion of a carriage 420 is seen through the opening 436. A top view of a link 430 connected to the carriage 420. As described above the link 430 is adapted to travel along the opening 436. An end cap (not shown) is secured onto the channel 415 typically by bolts 446. One or more flippers 450 can be used to position the vehicle on the planar surface 406. The flippers 450 are rotatably attached to the frame 405 by hinges 455. The flippers 450 can further include one or more idlers 460. The idlers 460 can be used to route the connecting member in different directions if so needed.

FIG. 5A illustrates a close up view of an embodiment of a carriage 520 and an embodiment of an end cap 545. This view shows one end of a channel 515 having a carriage 520 within the channel 515. The channel 515 is attached to a portion of the platform 505. As discussed above the channel 515 typically wraps around the carriage 520 and typically has a "C" shaped cross section. It is understood that the channel 515 can be other geometric cross sectional shapes. Included on the carriage 520 is a link 530 that protrudes from the channel 515 through a longitudinal opening 536 through which the link 530 can translate. The end cap 545 is attached to the end of the channel 515 to keep the carriage 520 from translating out of the channel 515 as described above. Bolts 546 can be used to secure the end cap 545 onto the channel 515. An end of a threaded shaft 525 is shown. As shown, the end cap 545 can also act as a bearing support for the threaded shaft 525.

FIG. 5A further illustrates an additional opening 570. In one implementation, the carriage 520 and link 530 are separate pieces and can be assembled by removing the end cap 545. FIG. 5B illustrates the carriage 520 outside of the channel but still on the threaded shaft 525. This illustration is for ease of discussion. The following discussion of the link 530 and carriage assembly describes the carriage 520 within the channel 515.

Referring still to FIG. 5A and also to FIG. 5B, which illustrates the carriage 520, the assembly of the carriage 520 and link 530 is now described. The end cap 545 can be removed by removing bolts 546 and sliding the end cap 545 out of the channel 515. With the end cap 545 removed the carriage 520 can partially translate out of the channel 515 when the threaded shaft 525 is rotated. When the carriage 520 protrudes slightly from the channel 515 a similar opening 575 (FIG. 5B) can be lined up with the opening 570. A short rod 585 (FIG. 5B) can then be placed through the opening 570 on the channel 515 and through the opening 575 on the channel while the link 530 is placed in a notch 580. The link 530 can be oval shaped. Therefore the link 530 can wrap around the rod 585 and therefore be secured onto the carriage 520. The link 530 can be a separate piece as described and then subsequently attached to a chain, strap, rope or other connecting member. The link can also be the link of a single chain used to attach to the vehicle or other load. The carriage 520 can then be retracted back into the channel 515 and the end cap 545 is secured onto the channel 515. Once the carriage 520 is retracted the opening 570 on the channel 515 and the opening 575 on the carriage 520 are no longer aligned and therefore the rod 585 cannot slip out of the carriage 520. Thus, the link 530 is secured in place while the carriage 520 translates along the channel 515. It is understood that there are various other ways that the link 530 and the carriage 520 can be assembled. For example, the link 530 and the carriage 520 can be a single integral piece.

FIG. 6 illustrates a close up of an embodiment of two power sources 635 and an embodiment of two bearing supports 640. As similarly described above, the power sources 635 each individually supply power to the power screw sections 608a, 608b. Each power source 635 has a bearing support 640. The bearing support includes two coupling holders 695 that make up an H-section shaped assembly that is adapted to house a coupler 690. The coupler 690 connects the threaded shaft 625 to the power source 635 and helps to stabilize the threaded shaft thereby preventing unwanted movement. A motor mounting flange 696 generally prevents the power source 635 from rotating. The motor mounting flange 696 operates to stabilize the power source 635. In operation, the power source provides a torque to the threaded shaft 625 to translate the carriage (not shown). As the carriage translates it causes tension on the connecting member (described further below). This tension in turn causes a torque back on the shaft 625 that tends to rotate the power source 635. The flange 696 helps to prevent this rotation and thereby stabilizes the power source 635. All of the bearing support pieces are held within the channel 615.

Referring still to FIG. 6, the power sources 635 are shown without any kind of connections. As described above, the power sources are typically hydraulic. FIG. 6 does not illustrate the hydraulic plumbing to the power sources 635. It is understood that the plumbing is needed for the power sources to work and has been omitted for ease of discussion. In another embodiment, the power sources 635 can be electric motors and the electrical wiring has been omitted. It is understood that the power sources 635 can be other mechanisms such as cranks gear boxes and the like.

Power Screw Load Retention Operation

The above figures have described the power screw load retention system. The discussion now turns to a full discussion of the operation of the system.

Referring again to FIGS. 2–6 with particular attention to FIG. 4, reference is made to the power screw sections 408a, 408b, 408c, 408d. A vehicle can be loaded onto the platform. From this view the car would be viewed from the top. A connecting member can then be connected to the underbody of the vehicle. Once the connecting members have been attached to the vehicle, the power screw sections are then activated. In one embodiment, each of the power screw sections can be individually powered so that each of the four corners of the vehicle are secured separately. In a typical embodiment, the power screw sections on each end of the vehicle are coupled. For example, the power sources (not shown in FIG. 4) of power screw sections 408a and 408c are coupled and 408b and 408d are coupled (e.g., by hydraulic plumbing). With such a coupling each end of the vehicle is secured independent from the other end. To achieve either an "A" or "V" tie-down orientation, the threaded shafts of each coupled power screw section 408a and 408c, 408b and 408d should desirably rotate in opposite directions so that the respective carriages 420, either move toward each other or away from each other within their respective channels 415, thereby resulting in either the "A" or "V" tie-down configuration. Furthermore, the anti-backdriving feature of the threaded shafts 425, the carriages 420 can be stopped by stopping the rotation of the threaded shafts 425, and there is no backdrive when the power sources 435 are stopped. Therefore, the tension in the connecting members remains constant and the vehicle is secured to the platform. In an implementation, the power screw sections 408a, 408b, 408c, 408d can contain sensors to detect predetermined tensions in the connecting members. The sensors can then be coupled to the power sources to automatically cut the power sources 435 off when the predetermined tension is achieved. In an embodiment, a hydraulic relief valve can be used to stop the power screw sections 408a, 408b, 408c and 408d. The predetermined tension can be set to be that tension that is enough to secure the vehicle.

FIG. 7 illustrates an alternative embodiment of a power screw load retention system 700. In this embodiment all of the power screw sections 708a, 708b, 708c, 708d are coupled together so that all four corners of the vehicle are secured at once. In this illustration, the power source 735 is a gear box to illustrate the coupling.

In a typical transporter embodiment, there are several platforms having the power screw sections. Each of the platforms are adapted to hold a vehicle. Regardless of how the power sources are coupled, each power source is connected to a control unit where the operator control the power screws. After the operator has connected the connecting members to the appropriate locations of the vehicle, the operator can go to the control unit and can tighten or loosen the connecting members from this location. In a typical embodiment, the power sources are connected to hydraulic plumbing and the control unit are hydraulic controls. In another embodiment, electrical controls via wiring to electric motors can be used.

Several embodiments have been shown. Various modifications are possible. For example, a channel had been shown to allow a carriage to translate. In another embodiment, the carriage can move along other types of structures such as cables. Furthermore, the carriage can be modified to add additional pieces to or in place of the link to support other connecting members such as straps and ropes.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A power screw apparatus, comprising:
    an elongated structure;
    a power source located on one end of the structure;
    a shaft connected to the power source in threaded engagement with a carriage, the carriage adapted to translate along the structure;
    a link connected to the carriage, the link protruding from a longitudinal opening located on an upper surface of the structure and running a portion of the length of the structure; and
    an end cap located on a side of the structure opposite the power source.

2. The apparatus as claimed in claim 1, wherein in the structure is a channel.

3. The apparatus as claimed in claim 1 further comprising a rod located within the carriage and substantially perpendicular to the shaft, the rod adapted to hold the link within the carriage.

4. The apparatus as claimed in claim 1, wherein the link is adapted to connect to a connecting member.

5. The apparatus as claimed in claim 4, wherein the connecting member is a chain.

6. The apparatus as claimed in claim 1, wherein the end cap is coupled to the shaft.

7. The apparatus as claimed in claim 1, wherein the power source is hydraulic.

8. A power screw apparatus, comprising:
    an elongated structure;
    a power source located on one end of the structure;
    a shaft connected to the power source in threaded engagement with a carriage, the carriage adapted to translate along the structure;
    an end cap located one a side of the structure opposite the power source;
    a bearing support located at a fixed location within the structure between the carriage and the power source, and a shaft coupling connected between the shaft and the power source and positioned within the bearing support; and
    wherein the bearing support includes a first substantially rectangular holder located on one side of the shaft coupling and a second substantially rectangular holder located on the other side of the shaft coupling, wherein the first and second holders are substantially perpendicular to the shaft positioned within the structure.

9. The apparatus as claimed in claim 8 further comprising a mounting flange located between the power source and the shaft coupling.

10. A power screw load retention system, comprising:
    a platform having a frame and one or more surfaces adapted to receive a load, wherein the platform includes a plurality of power screw sections having a load retention power screw apparatus, each apparatus comprising:
    an elongated channel;
    a power source located at a point along the channel;
    a shaft connected to the power source and in threaded engagement with a carriage, the carriage adapted to translate along the channel; and
    an end cap located on a side of the channel opposite the power source.

11. The system as claimed in claim 10, wherein one surface of the frame is a first surface on a first side of the frame and a another surface is a second surface on a second side of the frame, substantially parallel to and in the same plane as the first surface.

12. The system as claimed in claim 11 comprising a first line located adjacent the first surface that is parallel to a second line located adjacent the second surface, wherein a first and second power screw section are aligned with the first line and a third and fourth power screw section are aligned with the second line.

13. The system as claimed in claim 12, wherein the power source of the first power screw section is adjacent and coupled to the power source of the second power screw section, and wherein the power source of the third power screw section is adjacent and coupled to the power source of the fourth power screw section.

14. The system as claimed in claim 13, wherein the carriage of the first section and the carriage of the second section are adapted to translate toward one another and away from one another, and the carriage of the third section and the carriage of the fourth section are adapted to translate toward one another and away from one another.

15. A vehicle transporter, comprising:
a plurality of platforms adapted to receive a vehicle, each of the platforms having a plurality of load retention screw apparatuses, each apparatus comprising:
an elongated channel;
a power source located at a point along the channel;
a shaft connected to the power source and in threaded engagement with a carriage having a link protruding from a longitudinal opening located along a top surface of the channel, the carriage adapted to translate along the channel; and
an end cap located on a side of the channel opposite the power source.

16. The transporter as claimed in claim 15 further comprising a connecting member connected to the link of each carriage, each connecting member adapted to connect to the vehicle.

17. The transporter as claimed in claim 16 further comprising flippers connected to the platform, the flippers adapted to load the vehicle onto the platform.

18. The transporter as claimed in claim 17, wherein the flippers include idlers adapted to re-route the connecting members from the link to the vehicle.

19. The transporter as claimed in claim 15, wherein the power sources are connected to a control unit.

20. A vehicle transporter, comprising:
a plurality of platforms adapted to receive a vehicle, each of the platforms having a plurality of load retention screw apparatuses, each apparatus comprising:
an elongated channel;
a power source located at a point along the channel;
a shaft connected to the power source and in threaded engagement with a carriage, the carriage adapted to translate along the channel; and
an end cap located on a side of the channel opposite the power source.

* * * * *